L. L. SCOTT.
INTERMITTENT ROTATING MOTION.
APPLICATION FILED JULY 24, 1915.
1,218,959.  Patented Mar. 13, 1917.
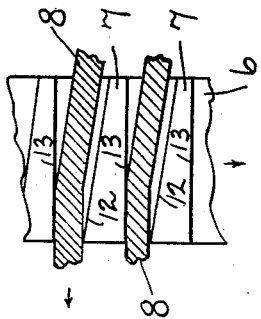
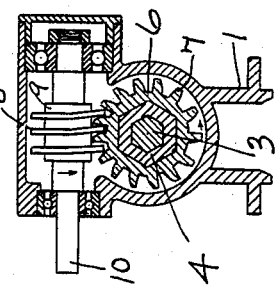
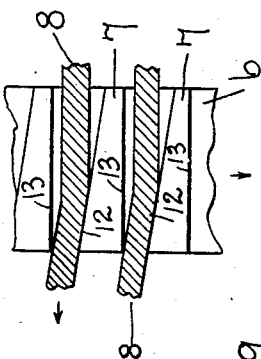
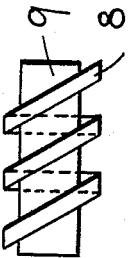
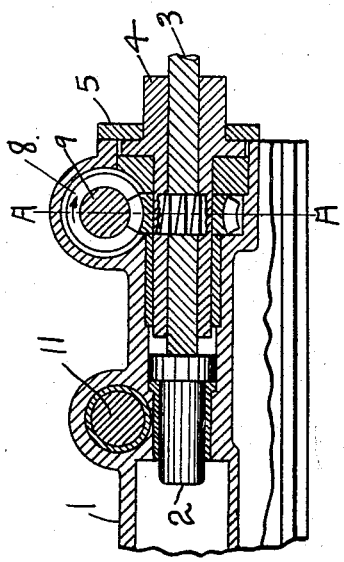
WITNESSES:  INVENTOR

UNITED STATES PATENT OFFICE.

LEWIS L. SCOTT, OF ST. LOUIS, MISSOURI.

INTERMITTENT ROTATING MOTION.

1,218,959.  Specification of Letters Patent.  Patented Mar. 13, 1917.

Application filed July 24, 1915. Serial No. 41,771.

*To all whom it may concern:*

Be it known that I, LEWIS L. SCOTT, a citizen of the United States, residing in the city of St. Louis and State of Missouri, have invented a new and useful Intermittent Rotating Motion, of which the following is a specification.

This invention relates to improvements in intermittent rotating devices intended to be used in connection with rock drills and the like.

The object of this invention is to provide an intermittent rotating motion, that may be used for intermittently rotating the drill steel of rock drills and the like, that is free from pawls, ratchets, springs, spiral nuts, etc.—thereby making a more simple and reliable rotation device.

To these ends my invention consists of various features of construction and arrangement of parts, as hereinafter described, illustrated in the accompanying drawings and particularly pointed out in the appended claims.

Referring to the drawings which form a part of this specification, Figure 1 is a vertical longitudinal section of the end of a percussive engine (such as shown and described in my United States Patent No. 1,058,268 granted to me April 8th, 1913) in which my intermittent rotating device is mounted. Fig. 2 is a sectional view on the line A—A of Fig. 1. Fig. 3 is an enlarged top plan view of a part of the wheel 6, showing the worm teeth 8 in a certain position. Fig. 4 is the same as Fig. 3 except that the worm teeth 8 are shown in a different position from that shown in Fig. 3. Fig. 5 is an enlarged view of the worm showing the double threads of the worm running half way around and the dotted lines show straight flange teeth of zero pitch connecting the adjacent threads of the worm—the reasons for so making these worm teeth will be explained later.

In the drawings 1 indicates the end of a percussive engine cylinder, 2 is a hammer block (which is adapted to be struck by a hammer piston which is not shown as it forms no part of the present invention) which contacts with the end of the drill steel 3; said drill steel 3 is shown of hexagon section and is slidably mounted in the chuck 4, said chuck 4 being retained or held in the cylinder 1 by the head 5; the wheel 6 is mounted on the chuck 4 and secured to said chuck so as to revolve with said chuck. The wheel 6 is provided with teeth 7 one side of which are cut straight (parallel to the axis of the wheel) and the other side of which are cut at an angle which corresponds to the angle of the worm teeth 8 cut on the worm 9. This worm 9 is what might be called a compound worm; it is a double threaded worm with threads cut away for 180 degrees and replaced with straight flange teeth of zero pitch, which connect the two adjacent threads of the worm for 180 degrees. The worm 9 is secured to, or made a part of the cross shaft 10; this cross shaft 10 may be driven from the crank shaft 11 by any suitable gearing which is not shown as it forms no part of the present invention. The side of the wheel teeth which are cut at an angle are marked 12 and the other side of these teeth which are cut straight are marked 13.

The operation of my intermittent rotating device is as follows: The worm 9 (which is revolved by any suitable gearing, which is not shown), engages the teeth 7 of the wheel 6. The direction of rotation of both worm and wheel is marked by the small arrows. When the angle teeth of the worm (which run around said worm for 180 degrees) contact with the teeth faces 12 of the wheel 6, said wheel 6 will revolve during one half revolution of the worm 9. When the straight flange teeth of the worm contact with the tooth faces 13 of the wheel 6, said wheel 6 will remain at rest while so engaged. It will be noted that a full bearing on the teeth is obtained before the wheel 6 is moved or stopped. By referring to Fig. 3 it will be noted that the angle teeth of the worm 9 are just about to disengage from the tooth faces 12 of the wheel 6, and that the straight flange teeth of the worm 9 are just about to contact with the straight tooth faces 13 at which point the wheel 6 will remain stationary while so engaged. Fig. 4 shows the straight teeth of the worm 9 just about to leave the wheel tooth faces 13, and the angle teeth of said worm 9 about to engage the wheel teeth faces 12.

It will be plainly seen from the above, that while the worm 9 is revolved continuously the wheel 6 will be revolved intermittently. It might be stated that the drill steel of a rock drilling machine, should not be turning at the time its cutting points come in contact with the rock to be chipped away; and further, it is necessary to turn the drill steel a small amount after each blow is struck, so as to bring the cutting points of the drill bit to a different surface on the rock.

What I claim is:

1. The combination with a worm wheel having teeth one side of each of which is substantially radial and the other side tangential, of a worm having a part of its thread arranged at a different angle from another part thereof.

2. The combination with a worm wheel having teeth one side of which is substantially radial and the other side tangential, of a worm having a part of its thread arranged at right angles to its axis and a part inclined thereto.

3. The combination with a worm wheel having one side of each of its teeth substantially radial and the other side inclined thereto and to the axis of the wheel, of a worm having a part of its teeth arranged at a different angle from another part thereof.

4. The combination with a worm wheel having one side of each of its teeth substantially radial and the other side inclined thereto and to the axis of the wheel, of a worm having a part of its thread arranged at right angles to its axis and a part inclined thereto.

In testimony whereof, I affix my signature, in the presence of two witnesses.

LEWIS L. SCOTT.

Witnesses:
Y. C. SANDOVAL,
S. GOLDMAN, Jr.

Copies of this patent may be obtained for five cents each, by addressing the "Commissioner of Patents, Washington, D. C."